March 29, 1960 R. A. DANDERS ET AL 2,930,300
TIMER FOR SELF DEVELOPING CAMERA
Filed Oct. 17, 1958
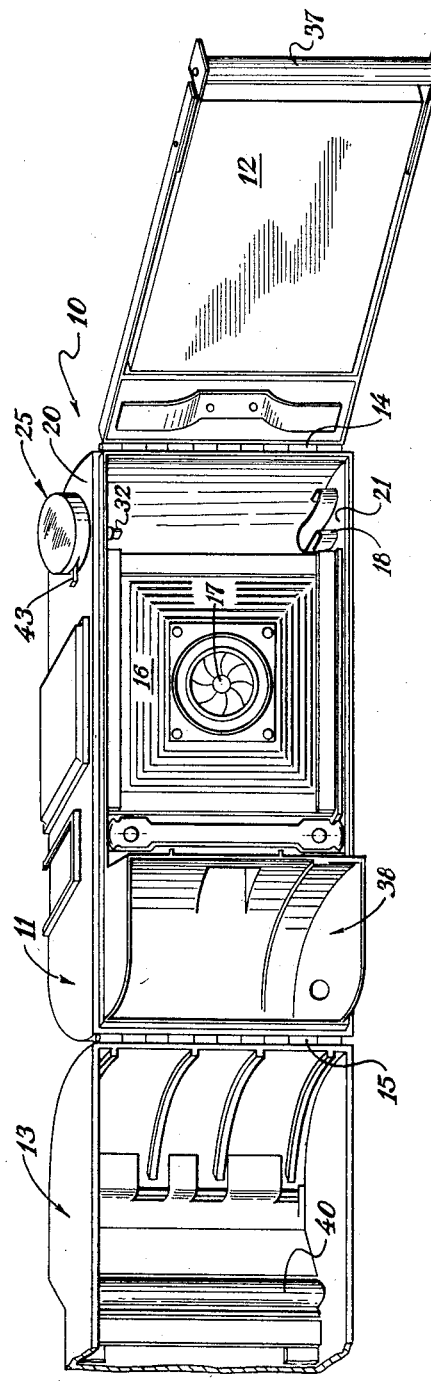
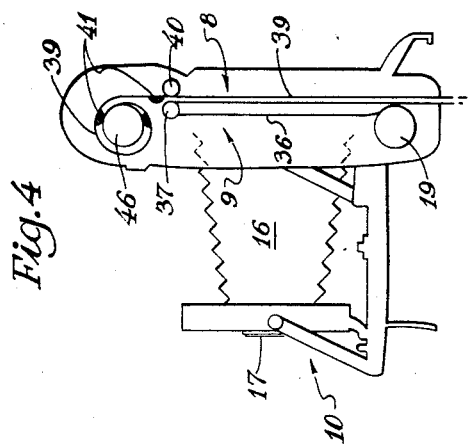
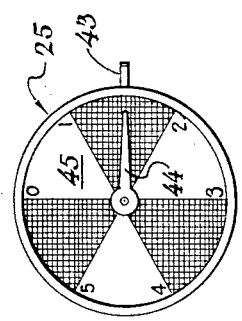
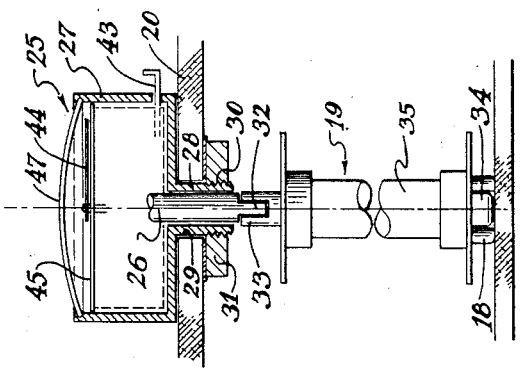
INVENTORS
RAYMOND A. DANDERS
HARRY D. NEWMAN
BY:
ATTY

United States Patent Office 2,930,300
Patented Mar. 29, 1960

2,930,300

TIMER FOR SELF-DEVELOPING CAMERA

Raymond A. Danders and Harry D. Newman, Chicago, Ill.

Application October 17, 1958, Serial No. 767,948

5 Claims. (Cl. 95—13)

The present invention relates generally to cameras for exposing and processing photosensitive material and more particularly to timers therefor.

The invention is illustrated in connection with a self-developing camera exemplified by the Polaroid Land camera but is not limited thereto, as the camera proper may take any desired form. In the Polaroid camera a strip of photosensitive negative material is fed from a disposable storage spool to a chamber where it is exposed to light, then together with a strip of positive material is passed into a light-tight processing chamber for development and image transfer, following which the latter chamber is opened and a developed picture removed by the operator. To insure proper development the strips of material must be retained within the processing chamber for a predetermined period of time. Knowledge by the camera operator of the expiration of this period of time is essential. A purpose of the present invention is to indicate automatically the expiration of this period of time.

For this purpose the present invention utilizes an interval timer of a conventional type having an energy storing spring, an escapement mechanism and a signal device which may be visual and/or audible. The timer further comprises an operating shaft which, when rotated, winds the spring, thereby storing energy therein, and also releases the escapement mechanism, thus actuating the wound-up timer. The actuated timer will unwind over an interval of time corresponding to a predetermined manual setting thereof. Upon termination of this interval the signal device is actuated to indicate this expiration.

The operating shaft of the timer is engaged to one end of the negative-holding spool. This spool rotates in response to the unrolling of the negative strip as it moves through the chambers. As this strip is moved into the processing chamber to initiate the development process, the resultingly rotating spool in turn rotates the timer operating shaft engaged thereto, thereby winding the timer and also actuating the latter. In this manner the timer is actuated simultaneously with the initiation of the development process. As previously noted, the timer may be manually adjusted beforehand so that upon actuation it will unwind over a time interval corresponding to a predetermined setting. The setting to be selected for the processing period varies with the temperature and may be ascertained by reference to instructions accompanying the camera.

To adapt the aforementioned type of camera for this timer one need only bore a hole in the camera casing at a point in alignment with the axis of the negative-holding spool for receiving the timer operating-shaft. This short simple operation is all that is necessary to adapt the camera for the timer.

In the present invention the disposable negative-holding spool is provided with a bifurcated end for receiving an appendage of the timer shaft, thus enabling rotational engagement of timer shaft and spool.

It is therefore a primary object of the present invention to provide a timer for automatically indicating the expiration of the processing period in a self-developing camera.

A further object of this invention is to provide a timer of the aforementioned type the adaptation of which to a rotation of the negative-holding spool.

Another object of this invention is to provide a timer of the aforementioned type the adaptation of which to a self-developing camera is simple and economical.

Other objects and advantages are inherent in the structure claimed and disclosed or will become apparent to those skilled in the art from the following detailed description in connection with the accompanying drawings wherein:

Fig. 1 is a perspective view of a self-developing camera with the rear and intermediate portions thereof swung open on their hinges and part of the rear portion cut away.

Fig. 2 is a vertical sectional view of a timer mounted atop the camera housing.

Fig. 3 is a plan view of the top surface of the timer.

Fig. 4 is a schematic diagram illustrating the principles of operation of the self-developing camera.

Referring to Fig. 1 the reference numeral 10 indicates generally a self-developing camera having a front portion 11, an intermediate portion 12, and a rear portion 13. Intermediate portion 12 and rear portion 13 are hingedly secured to front portion 11 at respective opposite ends 14, 15 so that portions 12, 13 may be swung open for loading and unloading of camera 10. When portions 12, 13 are swung shut intermediate portion 12 and front portion 11 enclose an exposure chamber 9 (schematically illustrated in Fig. 4) and back portion 13 and intermediate portion 12 enclose a processing chamber 8 (schematically illustrated in Fig. 4). For a more detailed description of the structure and operation of the self-developing camera see Patent Nos. 2,435,717 and 2,455,111.

Mounted to the front of portion 11 is a collapsible bellows 16 in the center of which is a lens 17. In Fig. 1, attached to the bottom right-hand portion 21 of front portion 11 is a bracket 18 for clasping the bottom end 34 of a negative-holding spool 19 (Fig. 2). Mounted in vertical alignment above bracket 18 and to the top wall 20 of front portion 11 is an interval timer 25 for automatically indicating the expiration of the processing period. Timer 25 is of a conventional type and is actuated in a manner to be subsequently described in detail.

Timer 25 has a cylindrical casing 27 enclosing a conventional timing mechanism (not shown), a transparent top cover portion 47, and a downwardly extending stem portion 28. Stem portion 28 extends through a hole 29 in top wall 20 and has a lower threaded part 30 for engagement by a nut 31 which secures timer 25 to top wall 20. A rotatable operating-shaft 26 extends downwardly from the timing mechanism within casing 27, through stem 28, and terminates in a narrow appendage 32 for engaging the bifurcated top end 33 of spool 19. Rotation of operating-shaft 26 winds a conventional energy storing spring within timer 25 (not shown) and releases a conventional escapement mechanism (not shown) to actuate the wound-up timer. Actuated timer 25 will unwind at a rate determined by a manual adjustment thereof to be subsequently described.

The body portion 35 of spool 19 holds a roll of negative photosensitive strip material 36 (Fig. 4). When spool 19 is engaged by its mountings 18, 32, body portion 35 and top end 33 thereof are actuable to rotate about their mutual axis in response to an unrolling pull on strip 36. Following insertion of spool 19 into camera front portion 11, negative strip 36 is unrolled from the spool and pulled across and behind lens 17. Intermediate portion 12 is then swung shut thereby enclosing exposure chamber 9 and causing a roller 37 at the outer end of intermediate portion 12 (to the right in Fig. 1) to contact and engage strip 36, which is then wound around roller 37 as shown in Fig. 4. A roll 46 of positive photosensitive strip material is then inserted within camera front portion 11 at a position 38 (Fig. 1) separated from spool 19 by bellows 16, and the positive strip 39 is unwound and passed over roller 37. Rear portion 13 is then swung shut, thereby enclosing processing chamber 8 and causing a roller 40 on rear portion 13 to contact and engage positive strip 39. When thus positioned, roller 40 faces roller 37 and the two are in substantially contacting engagement with strips 36, 39 therebetween.

Photosensitive negative strip 36 is exposed to light admitted into exposure chamber 9, whereby a latent photographic image is implanted on strip 36. Thereafter, negative strip 36 and positive strip 39 are moved simultaneously by manually controlled means through rollers 37, 40 into processing chamber 8. Attached to strip 39 are pods 41 of developer re-agent, and as strip 39 is passed between rollers 37, 40, a pod 41 is broken and the reagent therein is evenly distributed between the substantially contacting surfaces of strips 36, 39 thereby initiating the development process. As strip 36 moves through rollers 37, 40 into processing chamber 8, it unwinds from spool 19, thereby causing the latter to rotate, which in turn rotates timer operating shaft 26 thereby winding and then actuating timer 25.

Timer 25 is thus actuated to unwind over a time interval the beginning of which coincides with the initiation of the development process. The duration of this interval is determined by the setting to which timer 25 has been previously manually adjusted. This setting should correspond to the amount of time strips 36, 39 must be kept in contacting engagement within chamber 8 in order to produce a finished picture. The timer adjustment is accomplished by manually positioning a timer arm 43 projecting outwardly from within timer 25. A needle indicator 44 on the calibrated top surface 45 of timer 25 indicates the time setting corresponding to the position of lever 43.

As timer 25 unwinds, needle 44 moves in a counterclockwise direction (Fig. 3). When timer 25 has fully unwound needle 44 will point to zero, thus indicating the expiration of the predetermined period of time. In addition, a conventional audible signal device (not shown) actuable in response to the completion of the aforementioned unwinding may be provided to also indicate the expiration of the processing period.

It is to be understood that the specific embodiment of the invention shown in the drawings and described above is merely illustrative of one of the many forms which the invention may take in practice without departing from the scope of the invention as defined in the appended claims which are to be interpreted as broadly as possible in view of the prior art.

We claim:

1. A self-developing camera comprising a housing, a first rotatable spool within said housing and carrying a strip of negative photosensitive material, a second rotatable spool within said housing and carrying a strip of positive material, first and second chambers in said housing, a portion of said negative strip being disposed across said first chamber, means adjacent said first chamber for exposing said portion of the negative photosensitive strip disposed in the first chamber, manually controlled means for moving said exposed negative strip portion from said first chamber to said second chamber and for moving said positive strip from said second spool to said second chamber, means at the entrance of said second chamber for pressing together said moving positive and negative strips, a reagent carried by said positive strip for developing the strips in response to said pressing together of the strips and to retention of the pressed strips in said second chamber for a predetermined period of time, means mounting each of said spools for rotation in response to said movement of its respective strip into said second chamber, a timer actuable to indicate the passage of said predetermined period of time, and rotatable means on said timer engaging one of said spools for actuating the timer in response to said rotation of the engaged spool.

2. A self-developing camera as recited in claim 1 wherein said timer is vertically disposed with respect to one of the spools and said rotatable means comprises a shaft extending from the timer and detachably engaging one end of said spool.

3. A self-developing camera as recited in claim 2 wherein said spool has a bifurcated end for receiving said shaft.

4. A self-developing camera comprising a housing, a first cylindrical rotatable means within said housing and carrying a strip of negative photosensitive material, a second cylindrical rotatable means within said housing and carrying a strip of positive material, first and second chambers in said housing, a portion of said negative strip being disposed across said first chamber, means adjacent the first chamber for exposing said portion of the negative photosensitive strip disposed in the first chamber, manually controlled means for moving said exposed negative strip portion from the first chamber to said second chamber and said positive strip from said second cylindrical rotatable means to the second chamber, third and fourth cylindrical rotatable means at the entrance of the second chamber for pressing together said moving positive and negative strips, a reagent carried by the positive strip for developing said strips in response to said pressing together of the strips and to retention of the pressed strips in the second chamber for a predetermined period of time, means mounting each of said cylindrical rotatable means for rotation in response to said movement of the strips into the second chamber, a timer actuable to indicate the passage of said predetermined period of time, and rotatable means on said timer engaging one of said cylindrical rotatable means for actuating the timer in response to said rotation of said engaged cylindrical rotatable means.

5. A self-developing camera as recited in claim 4 wherein the timer is vertically disposed with respect to one of the cylindrical rotatable means and said rotatable means on the timer comprises a shaft extending from the timer and detachably engaging said cylindrical rotatable means.

References Cited in the file of this patent

UNITED STATES PATENTS

| | | |
|---|---|---|
| 2,741,961 | Anton | Apr. 17, 1956 |
| 2,794,377 | Fairbanks | June 4, 1957 |